United States Patent [19]

Shima et al.

[11] Patent Number: 4,667,294
[45] Date of Patent: May 19, 1987

[54] NUMERICAL CONTROL APPARATUS

[75] Inventors: Atsushi Shima, Tokyo; Takao Sasaki, Hachiouji, both of Japan

[73] Assignee: Fanuc Ltd, Minamitsuru, Japan

[21] Appl. No.: 700,702

[22] PCT Filed: Jun. 1, 1984

[86] PCT No.: PCT/JP84/00281

§ 371 Date: Jan. 31, 1985

§ 102(e) Date: Jan. 31, 1985

[87] PCT Pub. No.: WO84/04717

PCT Pub. Date: Dec. 6, 1984

[30] Foreign Application Priority Data

Jun. 2, 1983 [JP] Japan .................... 58-97004

[51] Int. Cl.$^4$ ............... G06F 15/46; G05B 19/18
[52] U.S. Cl. ...................... 364/474; 29/568; 364/171

[58] Field of Search ............ 364/474, 475, 468, 478, 364/167-171, 191-193; 29/568

[56] References Cited

U.S. PATENT DOCUMENTS

| 4,237,598 | 12/1980 | Williamson | 364/474 X |
| 4,497,029 | 1/1985 | Kiyokawa | 364/474 |
| 4,543,636 | 9/1985 | Noda et al. | 364/167 X |
| 4,547,854 | 10/1985 | Hashimoto et al. | 364/171 X |
| 4,549,270 | 10/1985 | Fukumura et al. | 364/191 X |

Primary Examiner—Joseph Ruggiero
Attorney, Agent, or Firm—Staas & Halsey

[57] ABSTRACT

In a numerical control apparatus, tools to be used are sequentially read out from a tool order list in accordance with an order of tools to be used (S2, S9), and blocks read out from the source program and using the tools are searched (S3, S6). A new program is created in accordance with a designated tool order (S4), and machining commands are generated by the new program.

7 Claims, 7 Drawing Figures

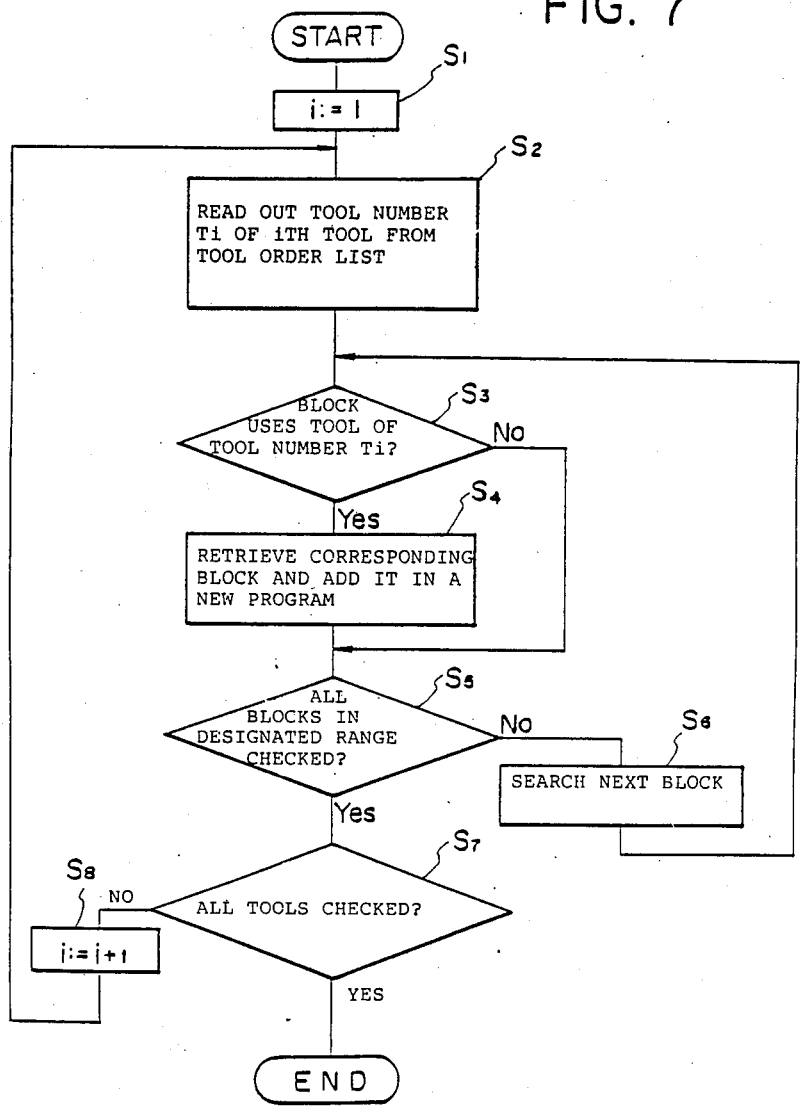

NUMERICAL CONTROL APPARATUS

BACKGROUND OF THE INVENTION

The present invention relates to a numerical control apparatus used in a machine tool.

A plurality of tools are used in a machine tool to machine a workpiece. In this case, when tools are frequently replaced, it takes a long time for tool replacement, thus prolonging machining time and degrading efficiency. In order to decrease the number of times tool replacement occurs, the machining operation as a whole is analyzed to create a program. In this case, all the machining steps must be analyzed to create the program, so that program creation results in time-consuming and cumbersome operations. A recently developed program created by a conversation type automatic program function requires a larger number of tool replacement times as compared with a program created by general NC commands.

For example, as shown in FIG. 1, in a program wherein holes A are formed in hole positions P1 to P8 of a workpiece W, and holes B, having a different diameter from that of the holes A, are formed in hole positions P9 and P10 thereof, respectively, a program created by a conversational format which does not consider the number of tool replacement times is required, as shown in FIG. 2. When this conversationally created program is executed, a tool T1 (center drill) is used to form small holes in the hole positions P1 to P8, and the tool T1 is replaced with a tool T2 (drill). The tool T2 is then used to form the holes A. The tool T2 is replaced with the tool T1 again, and the tool T1 (center drill) is used to form small holes in the hole positions P9 and P10. Thereafter, the tool T1 is replaced with a tool T3 (drill), and the tool T3 is used to form the holes in the hole positions P9 and P10.

According to the above program, the tool T1 is replaced twice, so that the number of tool replacement times becomes three, thus increasing the tool replacement time and hence the total machining time.

SUMMARY OF THE INVENTION

It is an object of the present invention to solve the above conventional drawback, by providing a numerical control apparatus, wherein the number of tool replacement times can be minimized.

It is another object of the present invention to provide a numerical control apparatus wherein the number of tool replacement times can be minimized within a designated range by designating all or part of a source program for machining.

In order to achieve the above objects of the present invention, there is provided a numerical control apparatus comprising: source program storage means for storing a source program which is not processed to designate a minimum number of tool replacement times; tool order setting means for storing data representing the order in which tools are to be used in machining in accordance with the source program; tool order change command means for generating a change command for changing the order of tools used in machining; program updating means for receiving the change command from said tool order change command means and for updating the source program in accordance with the order designated by said tool order setting means; and tool order updated program storage means for storing the updated source program. The numerical control apparatus further comprises tool order change range designating means for designating a range of a tool order change.

In the numerical control apparatus of the present invention, a tool order list is entered by tool numbers or the like at the tool order setting means, the tool order change range is entered by sequence numbers or the like of the source program at the tool order change range designating means, and the change command is entered at the tool order change command means. Upon reception of these inputs, the program updating means edits the source program within the change range in accordance with the designated tool order, and causes the tool order updated program storage means to store the updated program. An output is generated in accordance with the updated program so as to perform NC machining by with a minimum number of tool replacement times.

According to the numerical control apparatus of the present invention, when the tool order list and the tool order change range are designated (when the entire area of the source program is designated, the tool order change range corresponds to the entire source program area), the program is edited to cause the machine tool to perform operation in accordance with the designated tool order. After a tool is used once, it need not be replaced again. As a result, the tool replacement time can be decreased, thereby shortening the total machining time.

BRIEF DESCRIPTION OF THE DRAWINGS

FIG. 7 is a flow chart for explaining the processing performed by the apparatus shown in FIG. 6.

DETAILED DESCRIPTION OF THE PREFERRED EMBODIMENT

Figure 3:
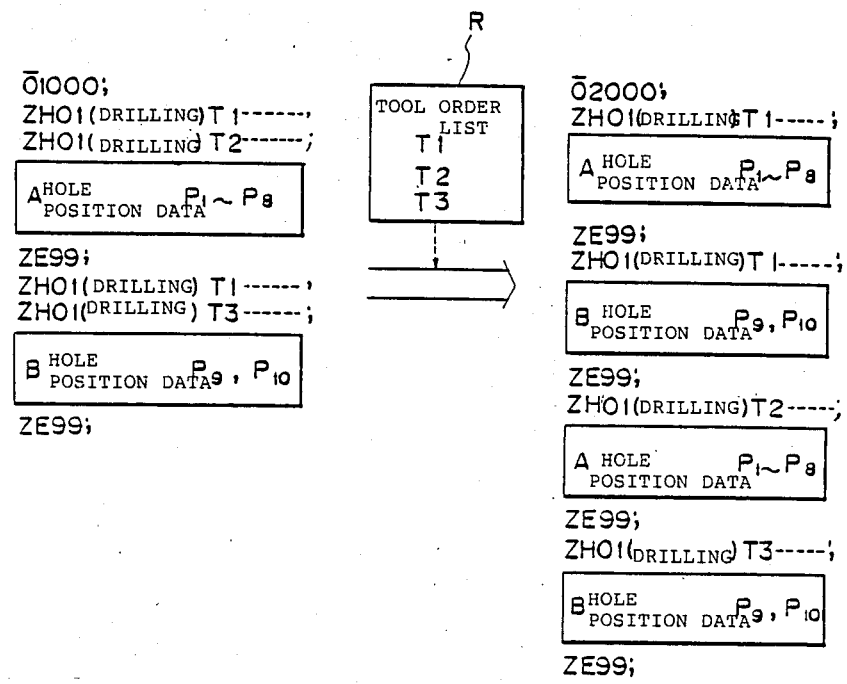
FIG. 3 is a chart for explaining the operation of a numerical control apparatus according to an embodiment of the present invention.

FIG. 3 is a chart for explaining the operation of the numerical control apparatus according to an embodiment of the present invention. When the holes A and B are formed at the hole positions P1 to P10 of the workpiece W shown in FIG. 1, a source program created in a conversational format is illustrated as a program (O1000) of FIG. 3. In the numerical control apparatus of this embodiment, an order of tools used in machining is designated by a tool order list R by means of tool numbers or the like to edit the source program and to produce a new program (O2000). The holes are formed in accordance with the new program (O2000). More particularly, all operations with the first tool T1 designated by the tool order list R are performed. In this case, the small holes are formed by the tool T1 at the hole positions P1 to P8 and the hole positions P9 and P10. Subsequently, the tool T2 is selected to form the holes A at the hole positions P1 to P8, respectively. Finally, the tool T3 is selected to form the holes B at the hole positions P9 and P10, respectively. The tools from the tool T1 to the tool T3 are replaced only twice. The tool replacement can be decreased to two times, as compared with the source program (O1000) which requires tool replacement three times. When many tools are used in complicated machining and some of the tools are commonly used, the total number of replacement times can be decreased, thereby shortening the total machining time.

Figure 4:
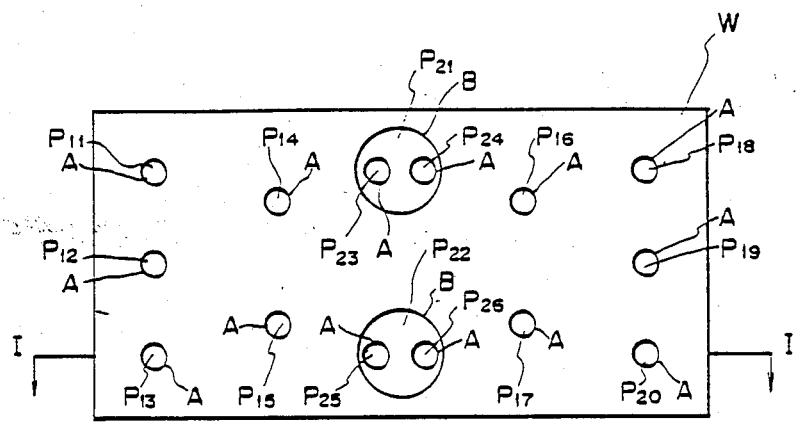
FIGS. 4 and 5 are respectively a plan view and a sectional view for explaining a machining example according to the present invention.
Figure 5:
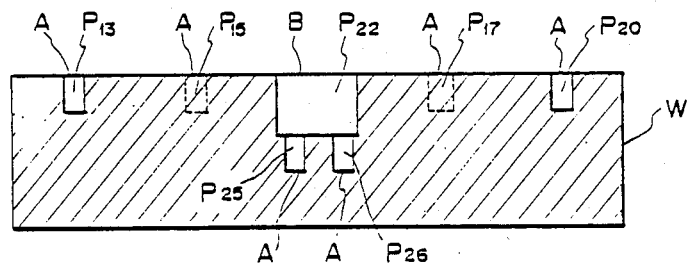

As shown in FIGS. 4 and 5, when small holes A are formed at hole positions P23 to P26 after the large holes B are formed at hole positions P21 and P22, respectively, the program can be edited in accordance with the tool order, as shown in FIG. 3. More particularly, if the tool T1 is used to form the holes A at the hole positions P23 to P26, and the next tool T3 is used to form the large holes at the positions P21 and P22, the small holes A (P23 to P26) formed in the bottom surfaces as the hole positions P21 and P22 will disappear. In order to prevent this, the sequence numbers of the source program are designated to edit the program in accordance with the tool order list, thereby designating the editing range.

Figure 6:
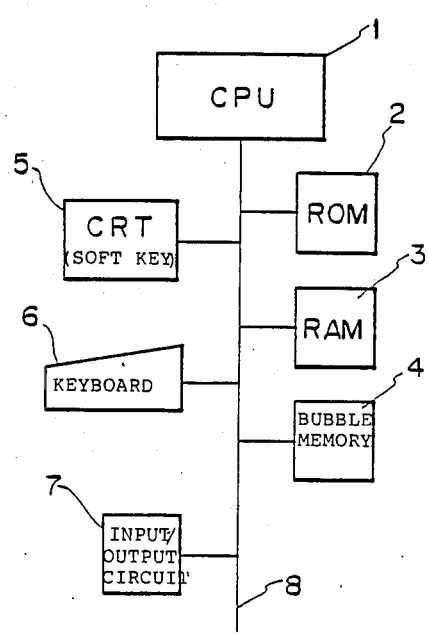
FIG. 6 is a block diagram of the numerical control apparatus according to an embodiment of the present invention.

FIG. 6 is a block diagram of the hardware for the numerical control apparatus according to an embodiment of the present invention. Reference numeral 1 denotes a central processing unit (CPU); and 2, a ROM for storing a control program for controlling the overall operation. The CPU 1 and the ROM 2 constitute a program updating means for updating the source program to a new program in accordance with the control program stored in the ROM 2. Reference numeral 3 denotes a RAM for storing processed data and the tool order list R. Reference numeral 4 denotes a storage means for storing source and new programs. The storage means 4 comprises a programmable nonvolatile memory. In this embodiment, the nonvolatile memory 4 comprises a bubble memory. Reference numeral 5 denotes a display unit (CRT) for displaying a program when the program is created in a conversational format. Soft keys are arranged in the display unit 5 to change the tool order. Reference numeral 6 denotes a keyboard which constitutes the tool order setting means, the tool order change range setting means and the tool order change command means for entering the program tool order list, the tool order change designation range and the tool order change command. Reference numeral 7 denotes an input/output circuit for connecting the numerical control apparatus to a machine tool; and 8, a bus.

The operation of the numerical control apparatus having the arrangement described above will be described hereinafter.

Figures 1, 2:
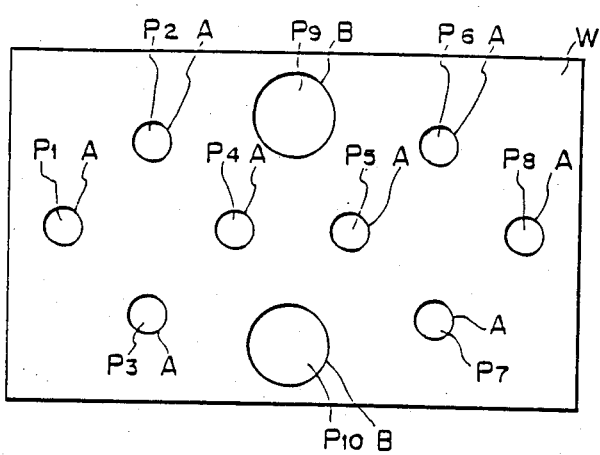
FIG. 1 is a plan view for explaining a machining example.
FIG. 2 is a diagram of a conventional program which does not control so as to minimize the number of tool replacement times.

Assume that a program created by the conversational operation or the source program (O1000) which does not consider the number of tool replacement times, shown in FIGS. 2 and 3 is stored in the bubble memory 4 through a tape reader (not shown). The tool numbers in terms of the order of tools used in machining are entered as the tool order list R at the keyboard 6 and are stored in the RAM 3. The tool order change soft key on the display unit 5 is operated. Thereafter, the sequence numbers of the start and end blocks of the range of the source program subjected to change in tool order, are entered at the keyboard 6. The CPU 1 stores the sequence numbers of the start and end blocks and searches for the start sequence number of the designated range subjected to the change in tool order. Data of the source program (O1000) up to the start sequence number is copied and is stored as a new program (O2000) in another memory area in the bubble memory 4. After the start sequence number, the operation shown in FIG. 7 is performed. A tool number of the first tool T1 is read out (step S2) as a parameter i=1 (step S1) from the tool order list R stored in the RAM 3. Subsequently, the CPU 1 checks whether or not the block represented by the start sequence number of the program (O1000) corresponds to the block for using the tool T1, i.e., corresponds to the block assigned with the tool number of the tool T1 (step S3). If YES in step S3, the corresponding block is retrieved and added to the new program (O2000) (step S4).

The CPU 1 then checks whether or not the designated range subjected to the change in tool order is entirely checked, i.e., the sequence number of the end block among the designated sequence numbers is checked (step S5). If NO in step S5, the next block is searched, and the steps S3 and S4 are executed again. When the designated range is entirely checked for the first tool T1, and the new program (O2000) is created, the parameter i is updated to 2, so that the same operation as described above is performed for the second tool T2. When the above operation is performed from the start to end block sequence numbers for all the tools represented by the tool order change list R (steps S5 and S7), the program (O000) is stored in the bubble memory 4 in accordance with the designated tool order. The program (O000) after the end block sequence number is shifted to the new program (O000), so that the new program (O2000) is completed and stored in the bubble memory 4. In this state, the source program (O000) is left in the bubble memory 4. However, this program may be deleted by tape editing if required.

In the above embodiment, the tool order change designation range is one. However, when a plurality of tool order change designation ranges are entered, the CPU 1 searches from the start block sequence number to the end block sequence number of each tool order change designation range. During this period, the operation shown in FIG. 7 has been performed. The program portion excluding the tool order change designation ranges can be shifted to the new program.

What is claimed is:
1. A numerical control apparatus comprising:
source program storage means for storing a source program which includes a plurality of blocks and is not prepared to effect machining with a minimum number of tool replacement times;
tool order setting means, operable by an operator, for setting the order in which tools are to be used in machining;
tool order change command means, operable by the operator, for generating a change command for changing the set order in which tools are used in machining;
tool order change range designating means, operable by the operator, for designating at least one set of start and end blocks defining at least one program updating range of the source program to be subjected to change in tool order;
program updating means for receiving the change command from said tool order change command means, and for updating for every block at least one portion of the source program falling within the at least one program updating range in accordance with the order designated by said tool order setting means; and tool order updated program storage means for storing the updated source program.

2. An apparatus according to claim 1, wherein said program updating means comprises a central processing unit and a memory connected to said central processing unit.

3. A numerical control apparatus according to claim 2, wherein said tool order setting means and said tool order change command means are formed by a keyboard.

4. An apparatus according to claim 3, wherein said tool order updated program storage means comprises a bubble memory.

5. An apparatus according to claim 1, wherein said tool order setting means, said tool order change command means and said tool order change range designating means are formed by a keyboard.

6. An apparatus according to claim 5, wherein said tool order updated program storage means comprises a bubble memory.

7. A method of editing a source program which includes a plurality of blocks, for a numerical control apparatus, comprising the steps of:
  (a) setting the order in which tools are to be used in machining;
  (b) generating a change command for changing the set order in which tools are to be used in machining;
  (c) designating at least one set of start and end blocks defining at least one program updating range of the source program to be subjected to a change in tool order;
  (d) automatically updating for every block at least one portion of the source program falling within the at least one program updating range, in accordance with the order designated in said step (a); and
  (e) storing the updated source program.

* * * * *

UNITED STATES PATENT AND TRADEMARK OFFICE
CERTIFICATE OF CORRECTION

PATENT NO. : 4,667,294

DATED : May 19, 1987

INVENTOR(S) : SHIMA et al.

It is certified that error appears in the above-identified patent and that said Letters Patent is hereby corrected as shown below:

Col. 2, line 17, delete "by".

Col. 3, line 39, change "nonvolatile memory 4" to --storage means 4--.

Col. 4, line 30, "(0000)" should be --(02000)--;
line 32, "(0000)" should be --(01000)--;
line 33, "(0000)" should be --(02000)--;
line 36, "(0000)" should be --(01000)--.

Signed and Sealed this

Thirteenth Day of October, 1987

Attest:

DONALD J. QUIGG

Attesting Officer

Commissioner of Patents and Trademarks